(12) United States Patent
Doragrip et al.

(10) Patent No.: US 8,186,066 B2
(45) Date of Patent: May 29, 2012

(54) MOTOR DRIVEN TOOL SUCH AS A POLE HEDGE TRIMMER WITH A LOCKING MECHANISM FOR THE TURNABLE CUTTING UNIT

(75) Inventors: Gusfaf Doragrip, Jonkoping (SE); Goran Dahlberg, Granna (SE)

(73) Assignee: Husqvarna AB, Huskvarna (SE)

( * ) Notice: Subject to any disclaimer, the term of this patent is extended or adjusted under 35 U.S.C. 154(b) by 729 days.

(21) Appl. No.: 12/268,151

(22) Filed: Nov. 10, 2008

(65) Prior Publication Data

US 2009/0100684 A1    Apr. 23, 2009

Related U.S. Application Data

(63) Continuation-in-part of application No. 10/534,779, filed as application No. PCT/SE03/01770 on Nov. 13, 2003, now abandoned.

(30) Foreign Application Priority Data

Nov. 19, 2002    (SE) ...................................... 0203436

(51) Int. Cl.
*B26B 15/00*    (2006.01)
*A01G 3/053*    (2006.01)
(52) U.S. Cl. ............ 30/296.1; 30/216; 30/272.1; 30/199
(58) Field of Classification Search ................. 30/296.1, 30/216, 210, 199, 392, 276, 375, 376; 56/11.3, 56/121.46, 123; 173/170, 164; 269/225–227, 269/6, 80, 74, 203; 74/89.2, 424.71, 500.5, 74/586, 164, 824; 81/57.34; 248/74.3; 24/279; 188/196 R
See application file for complete search history.

(56) References Cited

U.S. PATENT DOCUMENTS

| | | | | |
|---|---|---|---|---|
| 1,937,536 | A | * | 12/1933 | Steerup ............................ 422/22 |
| 2,621,568 | A | * | 12/1952 | Fletcher ........................ 404/112 |
| 2,689,507 | A | * | 9/1954 | McCrery ........................ 404/112 |
| 2,709,300 | A | * | 5/1955 | Blomberg et al. .............. 30/247 |
| 3,949,817 | A | * | 4/1976 | Rice ............................. 173/170 |
| 4,006,528 | A | * | 2/1977 | Katsuya .......................... 30/276 |
| 4,207,675 | A | * | 6/1980 | Causey et al. ................ 30/296.1 |

(Continued)

FOREIGN PATENT DOCUMENTS

EP    0834248 A2    4/1998

(Continued)

OTHER PUBLICATIONS

International Search Report dated Feb. 16, 2004; Application No. PCT/SE2003/001770.

*Primary Examiner* — Laura M. Lee
(74) *Attorney, Agent, or Firm* — Nelson Mullins Riley & Scarborough LLP

(57) ABSTRACT

A motor driven tool such as a pole hedge trimmer, a pole saw or the like includes a drive unit (11) that via a shaft tube (12) enclosing a drive shaft and being provided with a handle (16), is connected to a cutting unit (13) which is turnably secured to the shaft tube. The turnable connection is under the influence of a locking mechanism (L) which from the normal working position of the operator can be released by means of a control means (M) arranged at a distance from the locking mechanism (L) and close to the handle (16).

20 Claims, 14 Drawing Sheets

U.S. PATENT DOCUMENTS

| | | | |
|---|---|---|---|
| 4,651,420 A * | 3/1987 | Lonnecker | 30/296.1 |
| 4,848,846 A * | 7/1989 | Yamada et al. | 30/276 |
| 5,411,238 A * | 5/1995 | Caron | 248/664 |
| 5,594,990 A | 1/1997 | Brant et al. | |
| 5,662,428 A | 9/1997 | Wilson | |
| 5,787,536 A * | 8/1998 | Pate | 7/161 |
| 5,884,403 A * | 3/1999 | Rogers | 30/296.1 |
| 5,933,966 A | 8/1999 | Yates et al. | |
| 5,940,977 A * | 8/1999 | Moores, Jr. | 30/392 |
| 6,260,278 B1 * | 7/2001 | Faher | 30/276 |
| 6,301,866 B1 * | 10/2001 | Marshall et al. | 56/233 |
| 6,516,522 B2 * | 2/2003 | Schneider | 30/298 |
| 6,651,347 B2 * | 11/2003 | Uhl | 30/383 |
| 6,739,798 B2 * | 5/2004 | Vandewinckel et al. | 404/112 |
| 6,901,695 B2 * | 6/2005 | Lindroth | 47/1.43 |
| 7,018,132 B2 * | 3/2006 | Ewer et al. | 404/112 |
| 7,108,451 B2 * | 9/2006 | Ewer et al. | 404/112 |
| 7,258,261 B1 * | 8/2007 | Reyes | 227/110 |
| 7,823,652 B2 * | 11/2010 | Nemcek et al. | 173/1 |
| 7,992,308 B1 * | 8/2011 | Fisher | 30/216 |
| 2002/0095797 A1 | 7/2002 | Warashina et al. | |
| 2005/0246902 A1 * | 11/2005 | Poran | 30/201 |
| 2010/0101096 A1 * | 4/2010 | Yamaoka et al. | 30/199 |

FOREIGN PATENT DOCUMENTS

| | | | |
|---|---|---|---|
| EP | 0879553 A2 | | 11/1998 |
| GB | 2266682 A | | 10/1993 |
| GB | 2312821 | * | 11/1997 |
| JP | 09238572 | * | 9/1997 |
| JP | 2000201533 | * | 7/2000 |
| JP | 200681445 | * | 3/2006 |
| JP | 2007289126 | * | 11/2007 |
| WO | WO91/15944 | * | 10/1991 |
| WO | WO2005/055702 | * | 6/2005 |

* cited by examiner

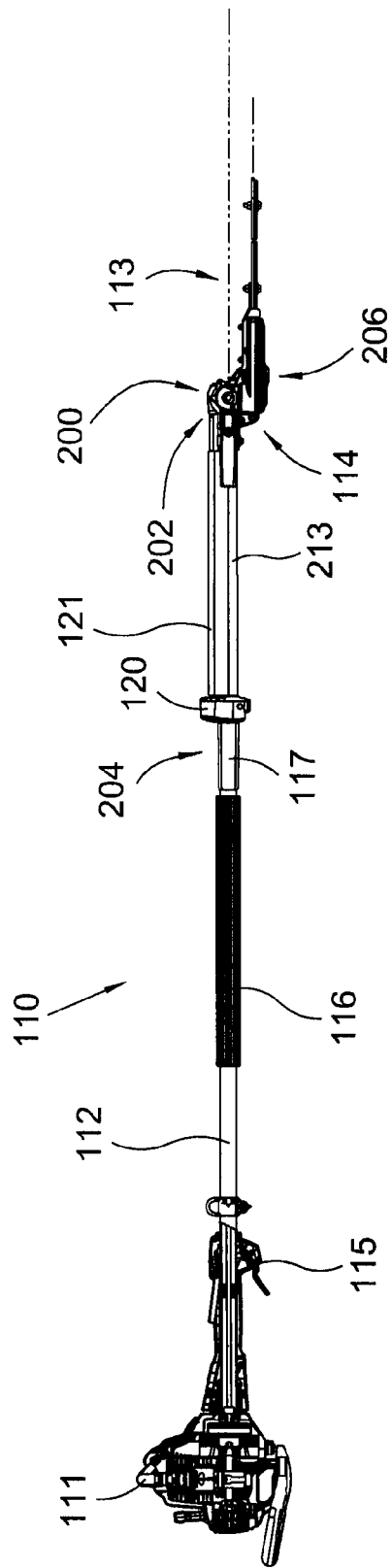
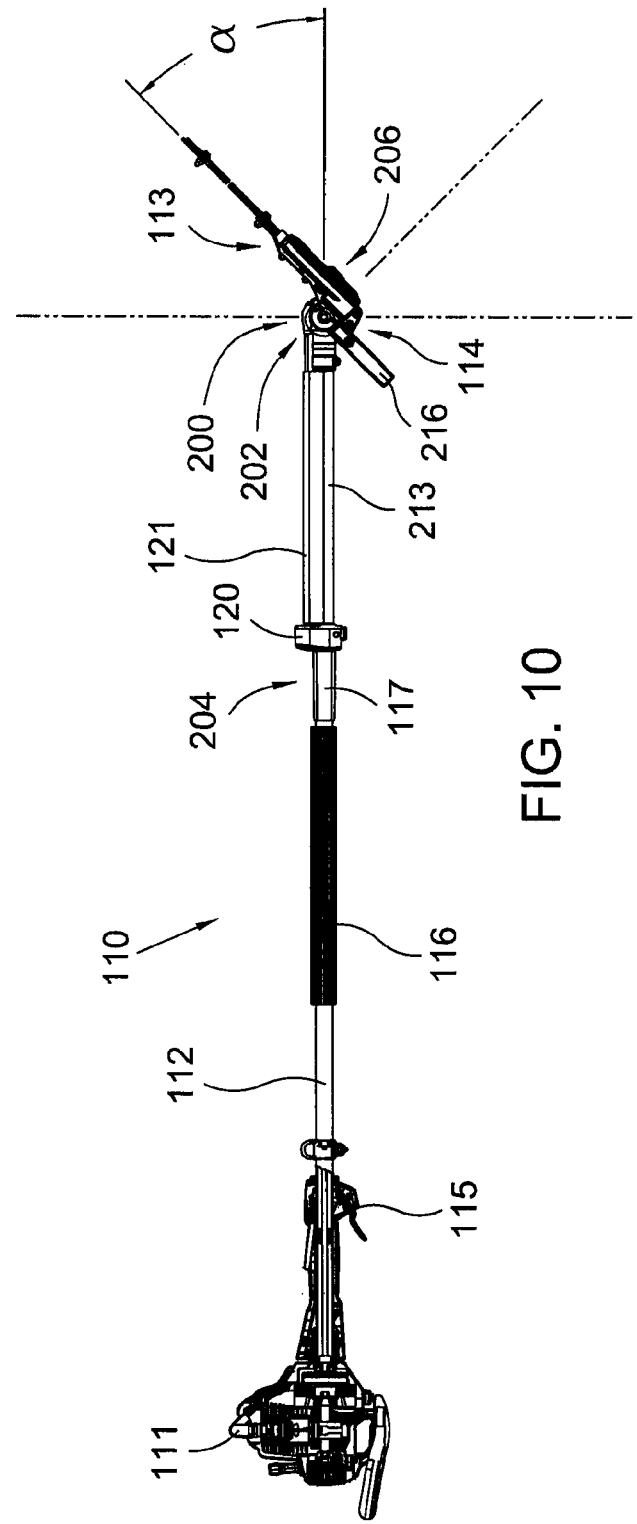
FIG. 9
FIG. 10

MOTOR DRIVEN TOOL SUCH AS A POLE HEDGE TRIMMER WITH A LOCKING MECHANISM FOR THE TURNABLE CUTTING UNIT

CROSS-REFERENCE TO RELATED APPLICATIONS

This application is a continuation-in-part application of application Ser. No. 10/534,779, filed Jul. 5, 2005, which claims the benefit of PCT Application No. PCT/SE03/01770, filed Nov. 13, 2003, which claims the benefit of Swedish Patent Application No. 0203436-1 filed Nov. 19, 2002, the entire disclosures of which are hereby incorporated herein by reference.

FIELD OF THE INVENTION

This invention relates to a motor driven tool such as a pole hedge trimmer, a pole saw or the like comprising a drive unit that via a shaft tube is connected to a cutting unit which is turnably secured to the shaft tube.

BACKGROUND OF THE INVENTION

Hedge trimmers and saws of the type mentioned above are provided with shaft tubes of different lengths and are used for trimming small as well as large trees, hedges, bushes and the like. These tools, that are provided with a handle having necessary control means for operating the drive unit and a further handle placed at the shaft tube, make it possible to find a comfortable working position when trimming bushes and trees and hedges since i.a. the cutting unit can be turned with respect to the shaft tube. This means that the operator before the work starts can put the cutting unit in a suitable angular position in order to adapt the severing or cutting means to the working position of the operator. However, the tools of today are designed such that the adjustment means are placed in close vicinity of the cutting unit. This means that adjustment operation is complicated since the operator is forced to leave hold of one or both handles in order to reach the locking means. Then the cutting unit has to be turned by means of a special handle before it is locked in its new position. The locking means and the special handle are usually also placed such that there is a risk that the operator gets injured by the cutting or severing parts of the cutting unit.

It is also previously known, see U.S. Pat. No. 4,651,420, to provide a pole cutter with an angle adjustment means for the cutter unit. The cutter unit is driven by the reciprocating motion of a Bowden cable and the adjustment means comprises a pivotable handle that via a rod is connected to the cutter unit support. The handle can be locked in different position by means of a teethed latch. This arrangement is however very poor and is not acceptable from a safety point of view since the latch can easily disengage from the handle which would cause the cutter unit to move uncontrolled. Moreover to change the angular position of the cutter unit the operator has to turn off the engine and move one of his hands from the grip to the latch to choose a new position for the latch before starting the engine again.

The purpose of this invention is to create an arrangement simplifying the adjustment procedure whereby the operator can turn the cutting unit with respect to the shaft tube mainly with preserved grip about the handle parts. This is achieved by means of a device having the characteristics mentioned in the claims.

BRIEF DESCRIPTION OF THE DRAWINGS

Several embodiments of the invention will now be described with reference to the accompanying drawings on which

FIG. 7 is a section on the line VII-VII in FIG. 6 whereas;

FIG. 9 is a side view of a pole hedge trimmer;

FIG. 10 is similar to FIG. 9, but shows an example cutting unit in an example angled position;

DESCRIPTION OF EXAMPLE EMBODIMENTS

Figure 1:
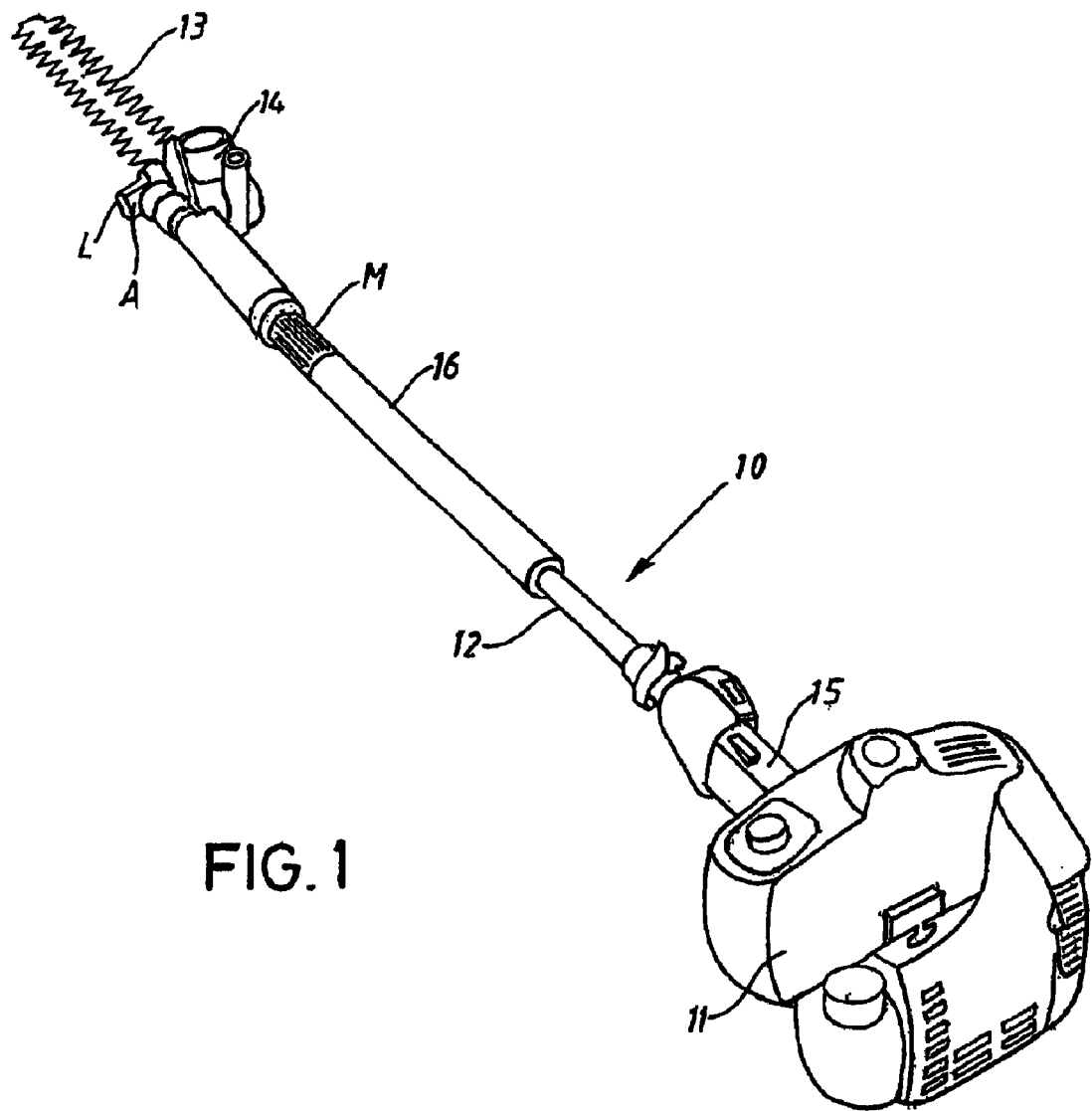
FIG. 1 is a perspective view of a pole hedge trimmer of the type in question.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

As appears form FIG. 1 the pole hedge cutter comprises a drive unit 11 which via a shaft tube 12 is connected to a cutting unit 13. The drive unit 11 can be of any type such as an internal combustion engine or an electric motor whose output shaft is connected to a drive shaft, not shown, that is placed within the shaft tube and that via a gear 14 is connected to the cutting unit. The shaft tube 12 has an inner handle 15 that is provided with throttle control means and additional control means for the drive unit and an outer handle 16 designed as a sleeve of grip friendly material. The cutting unit 13 in a conventional manner is provided with stationary, comb shaped knive protectors co-operating with corresponding knives arranged to move forwards/backwards and being driven by the drive shaft via the gear 14. The cutting unit 13 is by means of a turnable connection A supported by the shaft tube 12. The turnable connection comprises a braking and locking means L that can be released by means of a control means M arranged close to the outer handle.

Figure 2:
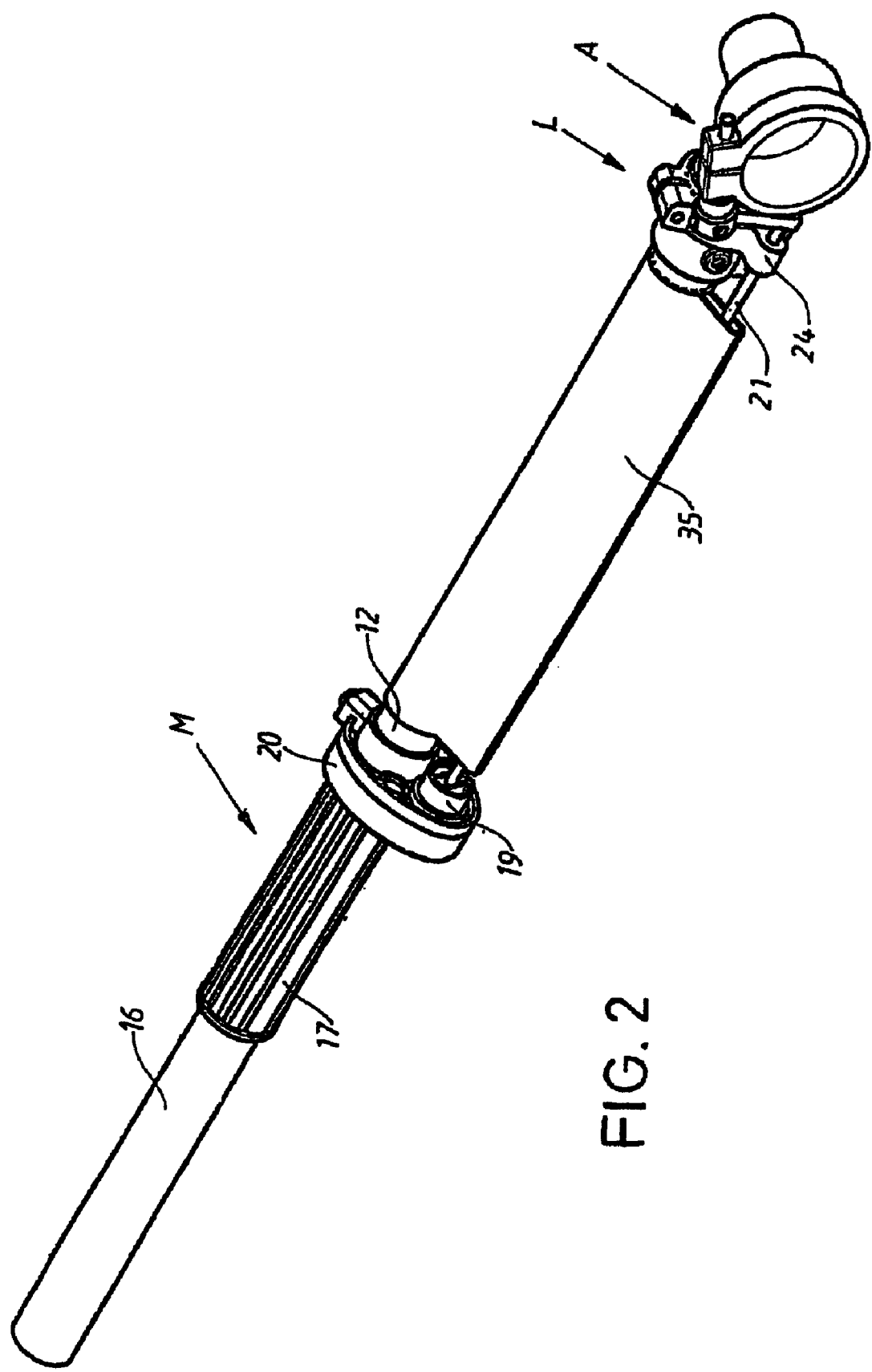
FIG. 2 is a perspective view of a first embodiment of the adjusting arrangement.

According to the embodiment shown in FIG. 2 the control means M comprises a turnable handle designed as a sleeve 17 and arranged outside the shaft tube 12 close to the outer handle 16. The sleeve 17 that preferably is provided with an outer shell of grip friendly material is at one of its end provided with an outer gear rim 18, see FIG. 3, co-operating with a tube socket 19 provided with a gear rim engaging the gear rim 18. The tube socket 19 is turnably supported in a gear box 20 surrounding the gear mechanism. The tube socket 19 drives a turning rod 21 having one end which is wave shaped and slideably arranged in a pocket of the tube socket 19 such that the turning rod follows the turning motion of the gear wheel at the same time as it has the possibility to move in the axial direction. The other end 23 of the turning rod is threaded and inserted into a lug 24 serving as a nut at the turnable connection A. The end part of the turning rod that extends from the lug is arranged to act on a lever 25 which is a part of the locking mechanism L. The lever 25 is supported for turning motion about a stub shaft 26 and has an abutment surface 27 resting against one end of a sleeve 28 whose other end rests against a shoulder 29 which is a part of a clamp connection arranged at the bearing housing and comprising a clamping ring 30 surrounding a turning shaft, not shown, of the cutting unit. The clamping ring 30 also comprises a shoulder 31 in which a screw 32 is threaded the screw being freely movable in a through hole in the shoulder 29 and being provided with a screw head 33 which is placed in the sleeve 28. Between the screw head 33 and the shoulder 29 there are several spring washers 34. In order to prevent branches from getting entangled between the shaft tube 12 and the turning rod 21 it is covered by a protecting shell 35 which is secured to the shaft tube.

Figure 3:
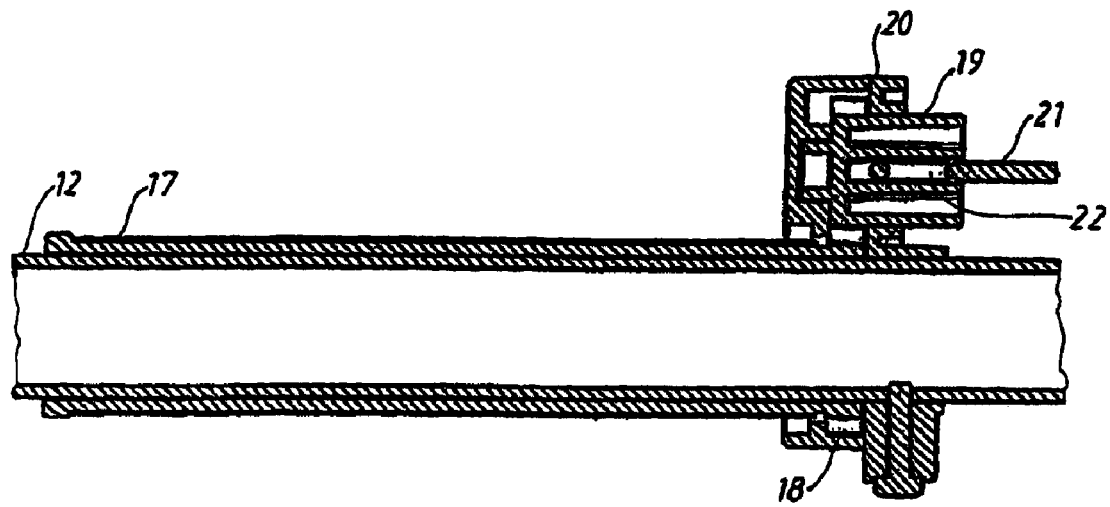
FIG. 3 is a section through a part of the arrangement shown in FIG. 2.
Figure 4:
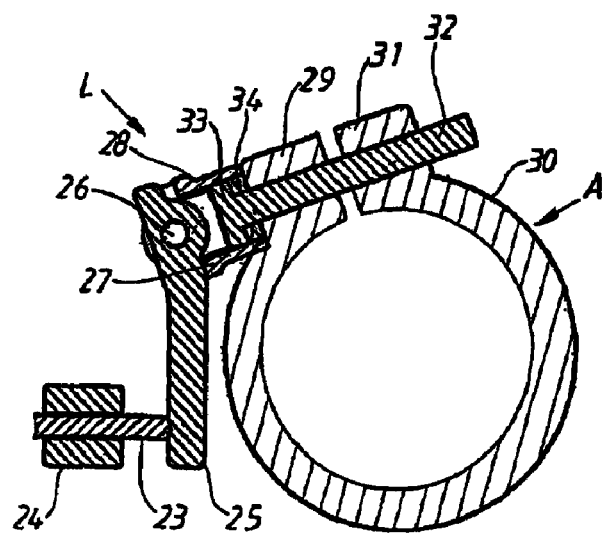
FIG. 4 is a section through another part of the arrangement shown in FIG. 2.

The arrangement shown in FIG. 2-4 operates in the following manner. When the operator desires to change the position of the cutting unit the sleeve 17 is turned which means that the tube socket 19 follows the motion and acts on the turning rod such that it by means of its threaded engagement with the lug 24 is moved axially to the left in FIG. 4 and hence influences the lever 25. This means that the lever is turned clockwise about the stub shaft 26 until the abutting surface 27 does not abut the sleeve 28 any longer which means that the shoulder 29 moves to the left in the figure such that the clamp ring 30 looses its grip about the turning shaft of the cutting unit. Because of the force created by the screw 32 and the spring washers 34 on the shoulder 29 a certain grip about the turning shaft is maintained. By pressing the cutting unit 13 against the ground or some other kind of counter acting object, thereby overcoming the braking moment that the spring washers create, the angle of the cutting unit with respect to the shaft tube 12 can now be changed. Then the cutting unit 13 is locked by turning the sleeve 17 in the opposite direction which means that the lever 25 will press the sleeve 28 against the shoulder 29 such that the distance between the two shoulders 29, 31 decreases thereby locking the clamping ring 30 about the turning shaft of the cutting unit.

Figure 5:
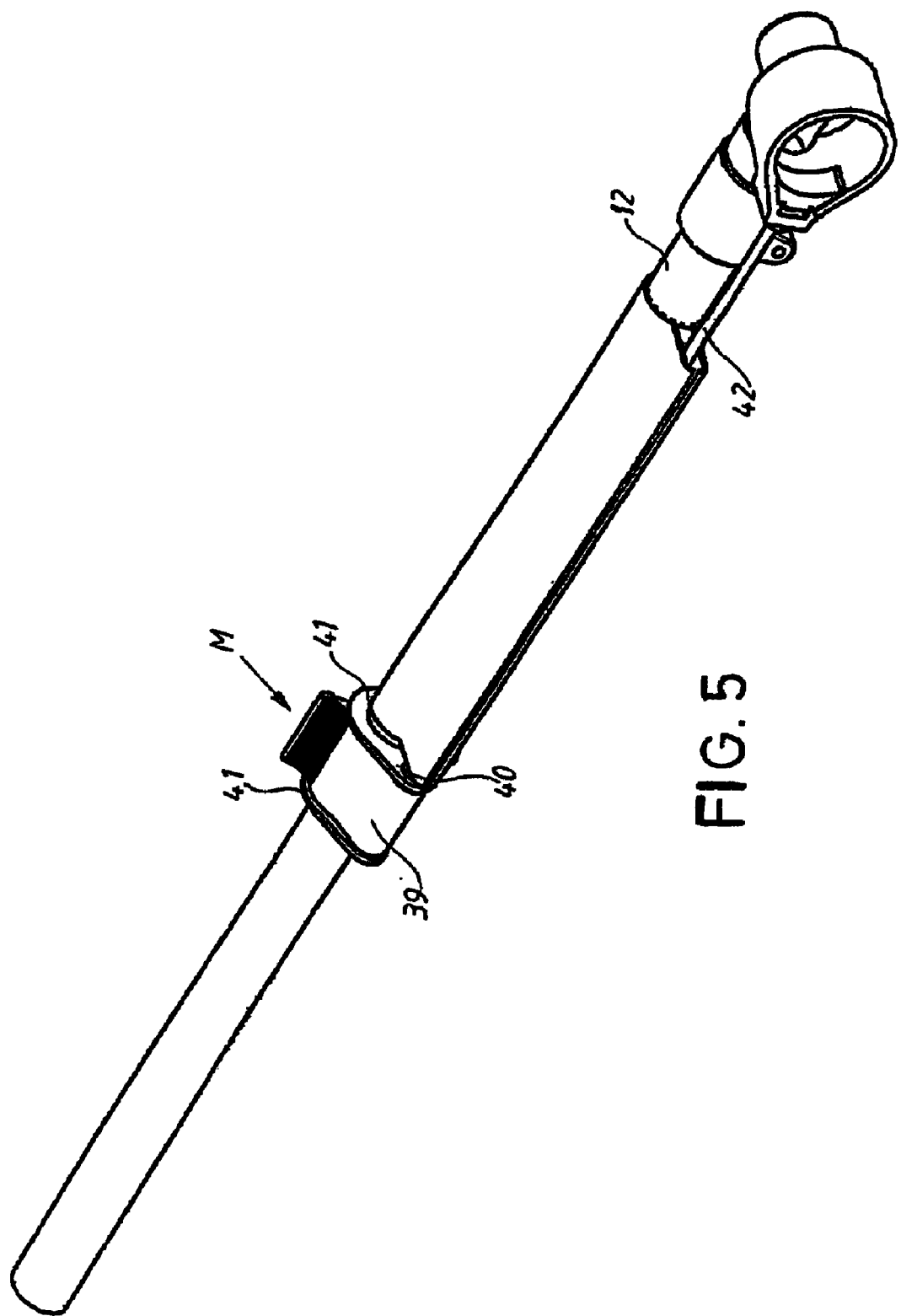
FIG. 5 is a perspective view of a second embodiment of the adjustment arrangement.
Figure 6:
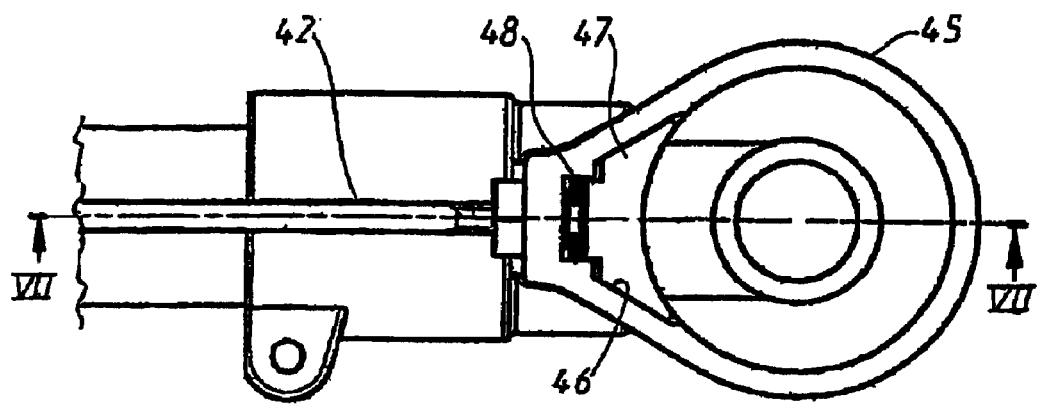
FIG. 6 is a side view of the locking arrangement shown in FIG. 5.
Figure 7:
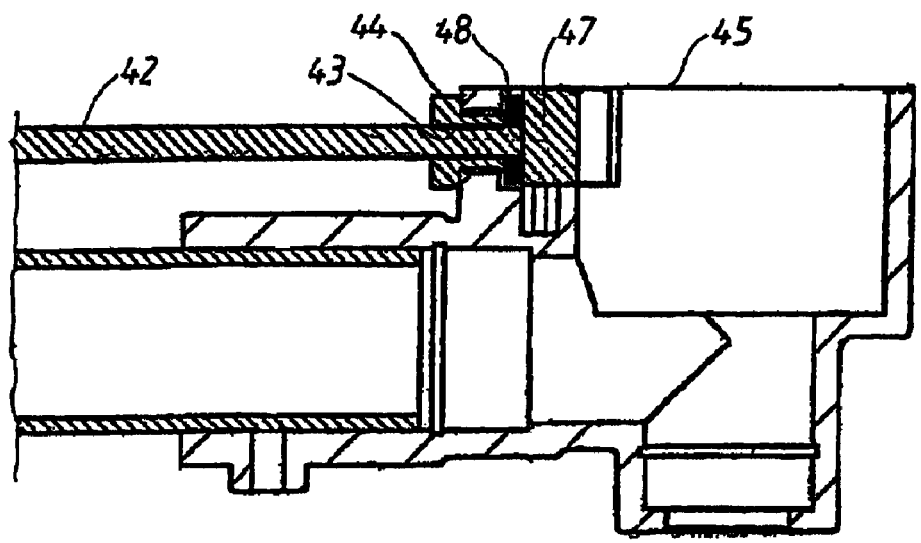

At the embodiment shown in FIG. 5-7 the control means M comprises an arm 39 which by means of a shaft 40 is turnably supported between two side walls 41 arranged on the shaft tube 41. The shaft 40 supports a pocket, not shown, which in the same manner as has been mentioned at the embodiments described above encloses one end of a turning rod 42 such that it can be moved axially at the same time as it is turned. The other end of the turning rod is threaded and inserted into a central, tube shaped, threaded opening 43 arranged in a screw 44 which is threaded into a bearing housing 45 surrounding the turning shaft, not shown, of the cutting unit. The bearing housing 45 is provided with a recess 46 directed towards the turning shaft and comprising a brake pad 47 movable in the radial direction. Between the brake pad 47 and the inner end of the screw 44 there are several spring washers 48 having a central opening in which the turning rod 42 is freely movable and arranged such that it abuts the brake pad 47.

The arrangement shown in FIG. 5-7 operates in the following manner. In order to adjust the angle of the cutting unit 13 with respect to the shaft tube 12 the arm 39 is acted on whereby the turning motion is transferred to the turning rod 42. This means that the turning rod by means of the engagement with the screw 44, which is stationary arranged in the brake drum, is moved axially towards the left in FIG. 7 such that the grip from the brake pad 47 on the cutting unit turning shaft, which is inserted in the surrounding bearing housing 45, ceases. Because of the spring force created by the spring washers on the brake pad 47 a certain braking moment on the turning shaft of the cutting unit is retained. This means that the operator can then push the cutting unit against a suitable counter acting object for instance the ground, in order to achieve a force by means of which the cutting unit can be turned with respect to the shaft tube. In order to lock the cutting unit in the new position the aim 39 is moved back to its original position which means that the turning rod will move towards the right in FIG. 6 and thereby push the brake pad 47 against the turning shaft. In order to set a suitable braking moment when the locking function is not activated the screw 44 can be turned such that the force created by the spring washers 48 against the brake pad 47 is changed in a suitable way.

Figure 8:
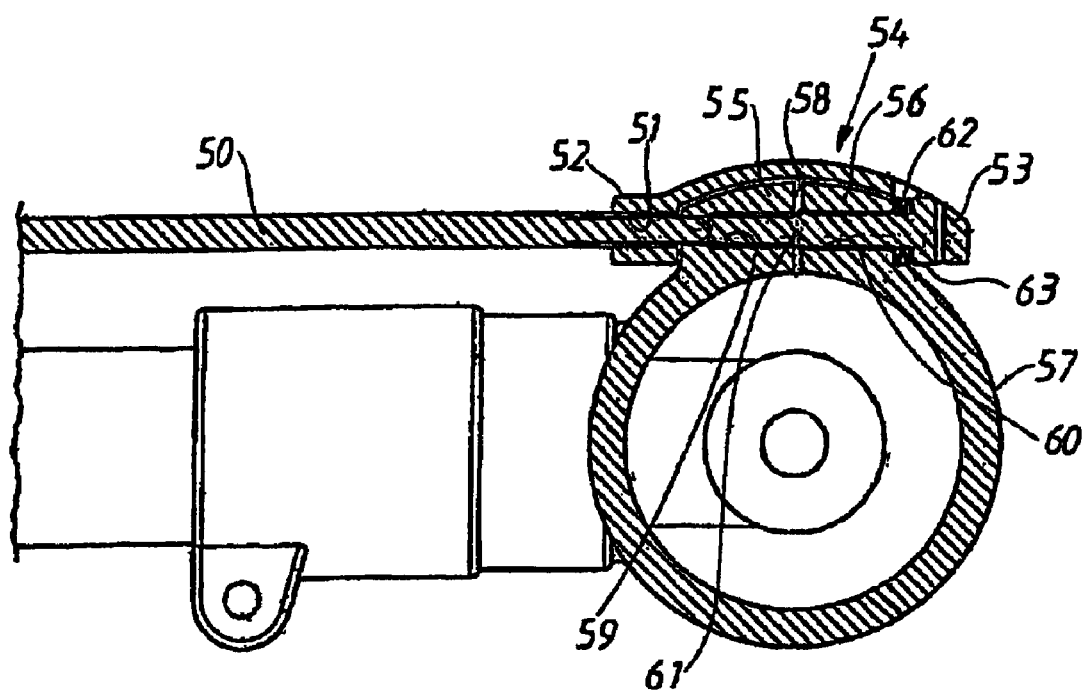
FIG. 8 is a further embodiment of the locking mechanism.
Figure 11:
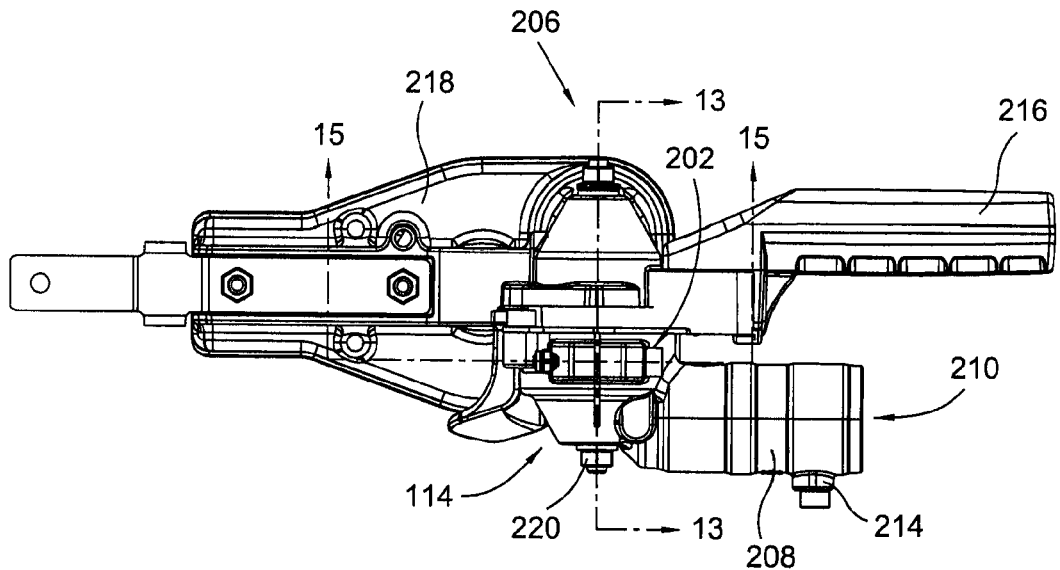
FIG. 11 is a top view of an example end drive unit.
Figure 12:
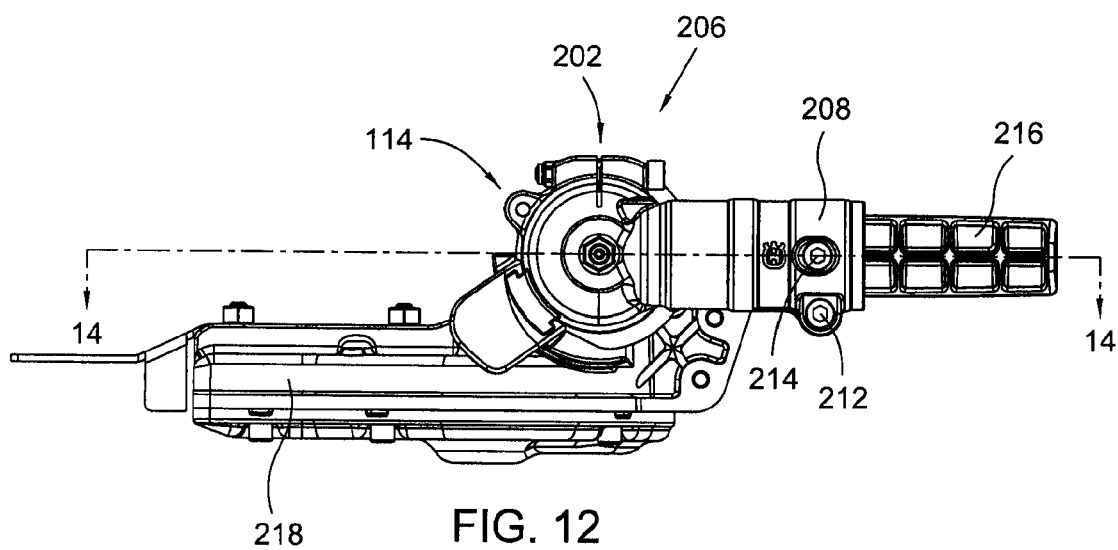
FIG. 12 is similar to FIG. 11 but shows a side view.

The embodiment of the locking mechanism L shown in FIG. 8, in the same manner as in the embodiments previously described, comprise a turning rod 50 which is influenced by a control means the end of the turning rod extending through a threaded through opening 51 of one of two legs 52, 53 of a U-shaped clamp shoe 54. The clamp shoe 57 partly surrounds two shoulders 55, 56 of a clamp ring 57 arranged on a bearing housing the clamp ring surrounding the turning shaft, not shown, of the cutting unit. The clamp shoe 57 has a slot 58 separating the two shoulders 55, 56 which are each provided with a through hole 59, 60 that are coaxial with the hole 51. The hole 59 is threaded and supports a screw 61 having one end abutting the end of the turning rod 50 and being partly threaded into the hole 59 whereas the screw runs freely through the hole 60. Further there are several spring washers 62 surrounding the screw 61 and placed between the shoulder 56 and the head 63 of the screw 61.

The locking mechanism described in FIG. 8, which might be used together with anyone of the control means M being previously described, operates in the following manner. When the locking function is to be loosed the control means is actuated such that the turning rod 59 becomes a turning motion which means that the turning rod because of the threaded engagement with the leg 52 of the clamp shoe 54 is moved towards the left in FIG. 8 with respect to the clamp shoe 54 such that the end of the turning rod 50 which is freely movable in the opening 59 disengages the end of the screw 61. This means that the force which is transferred from the clamp shoe 54 via the leg 53 to the screw head 63 ceases such that the locking effect disappears at the same time as a certain grip remains between the turning shaft of the cutting unit and the bearing housing because of the clamping force created by the spring washers 62. The operator can then change the angle of the cutting unit 13 with respect to the shaft tube in a manner described previously after which the control means is influenced to again lock the cutting unit in the new position.

It should in this connection be pointed out that the combination of the control means M and the locking means L which has been shown in the embodiments is solely illustrative and that it of course is possible to use them in any combination. It should also be stressed that even if the embodiments mentioned above relate to hedge trimmers the described arrangements are applicable also for similar types of tools such as for pole saws (i.e. saws on which a guide plate with a saw chain is arranged at the upper part of the shaft tube and a drive unit is arranged at the lower part of the shaft tube) clearing saws and trimmers having cutting units with saw blades and cutting filaments.

Turning now to FIGS. 9-10, yet another embodiment will now be described. Any or all of the features previously described herein may be included, though various other additional features can be added. Similar reference numbers, using a 100-series designation (i.e., 111, 112, etc.), will identify similar, such as identical, elements. Additional and/or different elements will be identified using a 200-series designation.

As appears in FIGS. 9-10, the pole hedge cutter 110 comprises a drive unit 111 which via a shaft tube 112 is connected to a cutting unit 113. The drive unit 111 can be of any type such as an internal combustion engine or an electric motor whose output shaft is connected to a drive shaft, not shown, that is placed within the shaft tube and that via a gear arrangement 114 is connected to the cutting unit for driving the cutting unit. The shaft tube 112 has an inner handle 115 that is provided with throttle control means and additional control means for the drive unit and an outer handle 116 designed as a sleeve of grip friendly material. The cutting unit 113 in a conventional manner can be provided with stationary, comb shaped knive protectors co-operating with corresponding knives arranged to move forwards/backwards and being driven by the drive shaft via the gear arrangement 114.

The cutting unit 113 is by means of a turnable connection 200 supported by the shaft tube 112. As with the previously described embodiments, the turnable connection 200 can include a locking means 202 (similar to L of FIG. 1) that can be released by means of a control means 204 (similar to M of FIG. 1) arranged close to the outer handle 116, as will be described more fully herein. As shown in FIGS. 9-10, the turnable connection 200 can enable the cutting unit 113 to pivot at an angle α (alpha) relative to a longitudinal axis of the shaft tube 112. For example, in FIG. 9, the cutting unit 113 can be arranged generally parallel to the longitudinal axis of the shaft tube 112 (i.e., the angle α is about zero degrees). The angle can be measured in various manners, and as described herein, is measured as relative to the blades of the cutting unit 113, which can be vertically co-axial with or even offset from the longitudinal axis of the shaft tube 112. As shown in FIG. 10, the cutting unit 113' can be rotated upwards relative to the longitudinal axis of the shaft tube 112, such as at an angle α of about 45 degrees (shown), or various other angles generally between about 0 degrees and 90 degrees (i.e., counter-clockwise). Similarly, though not shown, the cutting unit 113' can be rotated downwards relative to the longitudinal axis of the shaft tube 112, such as to various angles generally between about 0 degrees and 90 degrees (i.e., clockwise), as shown by the various phantom lines. In addition or alternatively, though also not shown, the cutting unit 113 may even be rotated about 180 degrees such that the knives of the cutting unit 113 are directed towards the drive unit 111 to facilitate storage or transport of the pole hedge cutter. The turnable connection 200 can permit the cutting unit 113 to rotate to any angle within a range, or can include structure that permits the cutting unit 113 to rotate to only a discrete number of predetermined angles.

As will be described more fully herein, the gear arrangement 114 can permit the knives of the cutting unit 113 to be driven by the drive shaft of the drive unit 111 regardless of the relative angle α of the cutting unit 113. Turning now to FIGS. 11-14, the gear arrangement 114 can include one or more gears for transferring the drive force from the drive unit 111 to the knives of the cutting unit 113.

The gear arrangement 114 can be maintained generally within an end drive unit 206 that is coupled to one end of the shaft tube 112. In one example, the end drive unit 206 can include a receiver 208 having a cavity 210 adapted to receive at least a portion of the end 213 (see FIG. 9) of the shaft tube 112. The receiver 208 can have a cross-sectional geometry generally corresponding to that of the shaft tube 112, and may include structure for securing the shaft tube 112 therein. For example, the shaft tube 112 can be maintained within the receiver 208 by way of an interference fit, keyed structure, friction fit, etc. In one example, as shown, the receiver 208 can include clamping structure including partially-separated side walls and a clamping screw 212 or the like adapted to clamp the partially-separated side walls against the portion of the shaft tube 112 inserted into the receiver cavity 210. In addition or alternatively, the receiver 208 can include a side clamping screw 214 or the like for clamping directly against a portion of the shaft tube 112 located within the receiver cavity 210, or even for threaded engagement with a corresponding hole of the shaft tube 112.

The end drive unit 206 can further include various other structure, such as a handle 216 and a drive assembly casing 218. The handle 216 can be grasped by a user to change the angle α of the cutting unit 113. The drive assembly casing 218 can include the supporting, gearing and/or other drive structure for supporting and driving the knives of the cutting unit 113. Thus, for example, one portion of the end drive unit 206 including the receiver 208 can be coupled to the shaft tube 112 remain generally stationary therewith, while another portion of the end drive unit including the handle 216 and the drive assembly casing 218 can be pivoted about a central pin 220 relative to the receiver 208 to change the angle α of the cutting unit 113. The central pin 220 can be maintained with nuts or other mechanical fasteners, adhesives, welding, etc.

Figure 14:
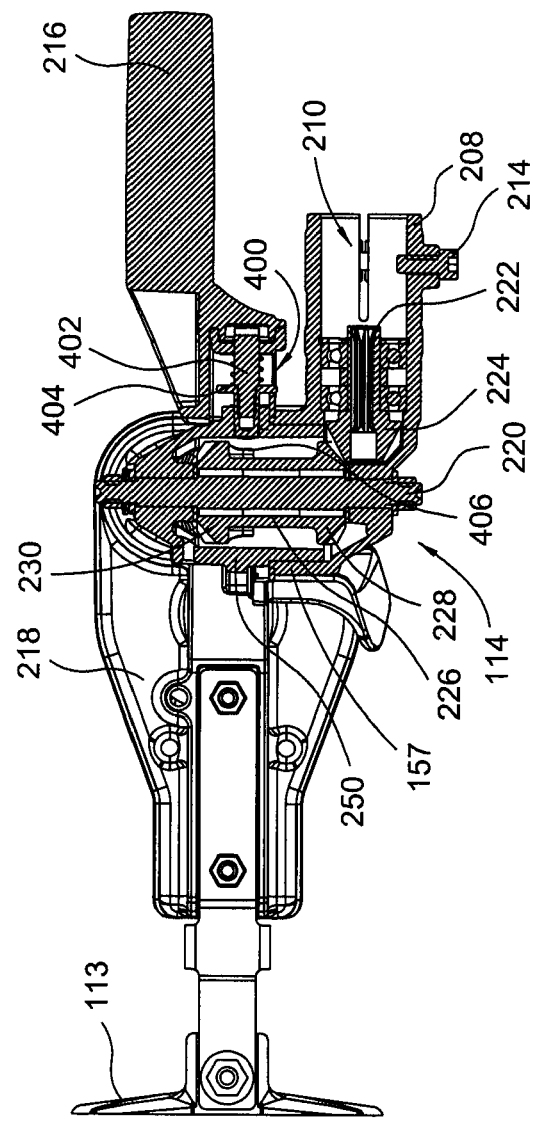
FIG. 14 is a sectional view taken along line 14-14 of FIG. 12.
Figure 13:
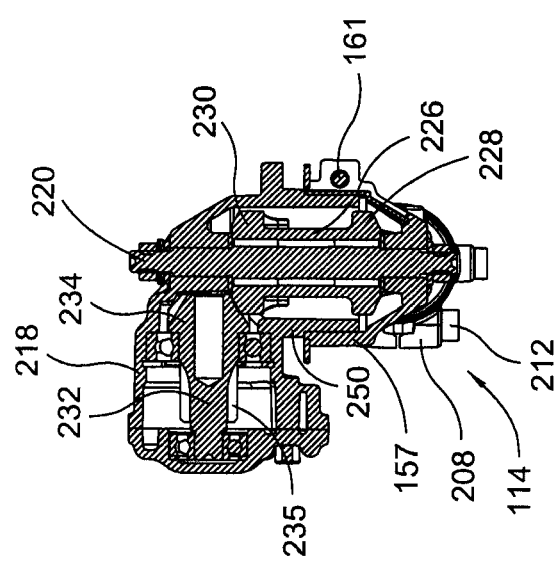
FIG. 13 is a sectional view taken along line 13-13 of FIG. 11.

Turning now to FIGS. 13-14, the gear arrangement 114 will be described in further detail. A drive shaft coupler 222 can be rotationally supported within the cavity 210 of the receiver 208 and can be adapted to be operationally coupled to an end of the drive shaft 211 (shown schematically). In one example, one end of the drive shaft coupler 222 can include spline shaft structure for engagement with corresponding spline structure (not shown) of the drive shaft 211, though various other coupling arrangements are contemplated, such as interference fits, frictional fits, clamping, welding or adhesives, mechanical fasteners, keys, etc. Another portion of the drive shaft coupler 222, such as the other end, can include a drive gear 224 for engagement with an input gear 228 of a transfer element 226. In one example, the transfer element 226 can be rotationally supported on the central pin 220, such as by needle bearings or the like, so as to be freely rotatable. The transfer element 226 can further include an output gear 230 for engagement with an input gear 234 of a final drive element 232. The final drive element 232 can also include an output gear 235 that can be operationally coupled to the final drive system for directly or indirectly driving the knives of the cutting unit 113. In one example, as shown, the output gear 235 can be located midway along the final drive element 232, while a distal end 236 of the final drive element 232 can be coupled to a rotational support or the like, though various other configurations are also contemplated.

Thus, rotation of the drive shaft causes corresponding rotation of the drive shaft coupler 222, which causes rotation of the transfer element 226, which in turn causes rotation of the final drive element 232 for driving the cutting unit 113. As a result, the cutting unit 113 can be driven by the drive shaft 211 of the drive unit 111 regardless of the relative angle α of the cutting unit 113 because of the angled relationship between the drive shaft coupler 222 and transfer element 226 and the similarly angled relationship between the transfer element 226 and the final drive element 232, and/or because the transfer element 226 is generally co-axial with the central pin 220, about which the cutting unit 113 pivots (i.e., the central pin 220 can be generally coaxial with the rotational axis of the cutting unit 113).

As noted above, the offset and/or angled relationships between the drive shaft coupler 222, transfer element 226, and final drive element 232 can permit the cutting unit 113 to operate at various positions. As shown, the respective angled relationships between the drive shaft coupler 222, transfer element 226, and final drive element 232 can each be approximately 90 degrees, though any can be oriented at various other angles. Accordingly, any of the various gears 224, 228, 230, 234 can include various styles of gears, such as bevel gears, though various other types of gears can be used, such as spur gears, helical gears, crown gears, hypoid gears, worm gears, planetary gears, etc. In addition or alternatively, any of the gears 224, 228, 230, 234 can include idler gears or the like interposed therebetween. Moreover, any of the gears 224, 228, 230, 234 can include differing relative sizes so as to provide differing rotational speeds and/or torques. Furthermore, it is to be understood that any or all of the various rotational elements described with the gear arrangement 114 can be supported by various rotational supports, such as various types of bearings, bushings, etc.

As described above, the turnable connection 200 that permits the cutting unit 113 to pivot relative to the shaft tube 112 can include a locking means 202 (similar to L of FIG. 1) that can be selectively engaged and released by means of a control means 204 (similar to M of FIG. 1) arranged close to the outer handle 116. Turning now to FIGS. 17-21, the control means 204 will be described in further detail.

The control means 204 can include a turnable handle designed as a sleeve 117 and arranged generally outside the shaft tube 112 close to the outer handle 116 (see FIG. 9). In other examples, the control means 204 could utilize a rotatable lever 39 or the like as previously described. The sleeve 117 can be provided with an outer shell of grip friendly material towards one end, and be provided with an outer gear rim 118 at the other end. Additionally, the sleeve 117 can be provided with a through hole 243 that can permit the drive shaft 211 (see FIG. 14) to extend therethrough and onto the end drive unit 206. The outer gear rim 118 can cooperate with a tube socket 119 provided with a gear rim 240 for engagement with the gear rim 118. Each of the gear rims 118, 240 can be fixedly coupled to or even formed with the sleeve 117 and tube socket 119, respectively, so as to rotate therewith. In addition or alternatively, any or all of the sleeve 117, tube socket 119, and/or gear rims 118, 240 can include a stop member (not shown) for limiting the relative rotation thereof.

Each of the sleeve 117 and the tube socket 119 can be turnably supported in a gear box 120 surrounding the gear mechanism such that the teeth of the gear rims 118, 240 are in engagement. The gear box 120 can be coupled to the shaft tube 112. Though not shown, various idler gears can be interposed between the gear rims 118, 240 for various reasons, such as for spacing and/or for modifying the rotational speed or torque. Thus, rotation of sleeve 117, for example, will cause corresponding rotation of the tube socket 119.

The tube socket 119 can be adapted to drive a generally rigid turning rod 121 (see FIG. 21) having one end 242 which can be wave shaped and slideably arranged in a pocket 244 of the tube socket 119 such that the turning rod 121 follows the turning motion of the gear rim 240, while at the same time being permitted to move in an axial direction relative to the tube socket 119. It is to be understood that the one end 242 for sliding engagement with the pocket 244 can have various geometries that permit simultaneous rotational and axial movement of the turning rod 121. In addition or alternatively, either or both of the tube socket 119 and the turning rod 121 can include structure that can inhibit, such as prevent, the one end 242 from inadvertent removal from the pocket 244. The other end 123 of the turning rod 121 can be threaded.

Figure 15:
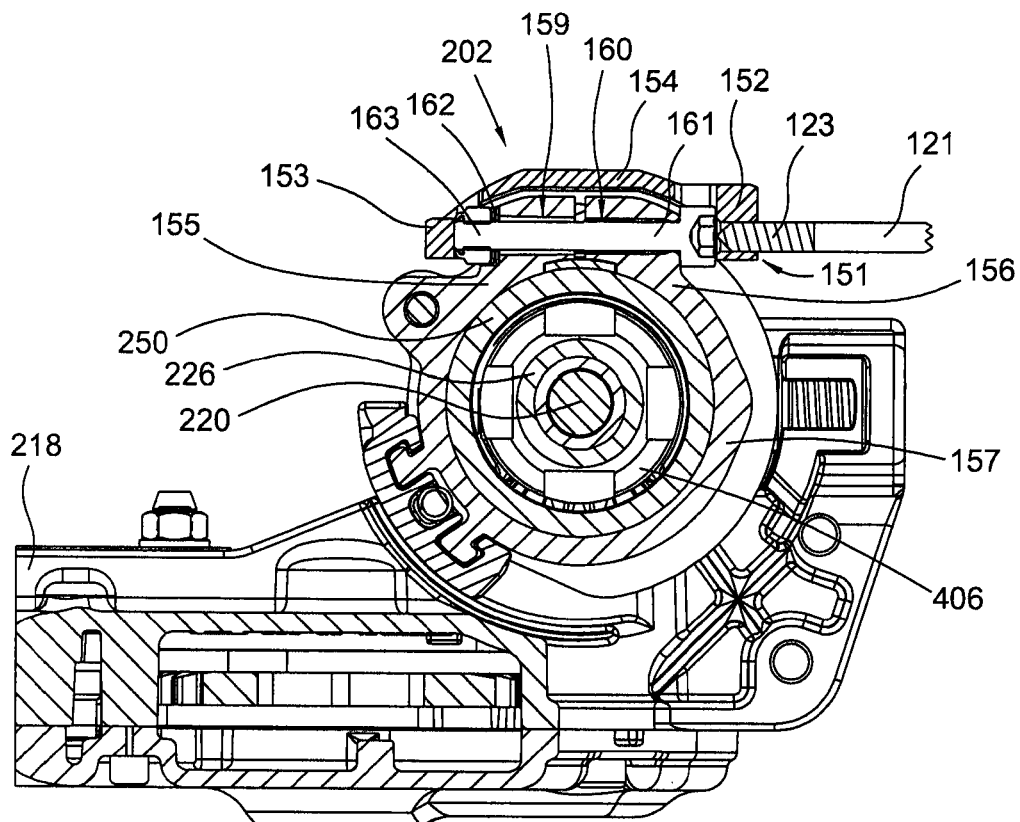
FIG. 15 is a sectional view taken along line 15-15 of FIG. 11.

Turning now to FIG. 15, the locking means 202 can be similar to that previously discussed herein regarding FIG. 8, though can also have various differences. For example, the locking means 202 can generally include a clamp ring 157 having two shoulders 155, 156 arranged on a bearing housing 250 surrounding the central pin 220 and transfer element 226 for driving the cutting unit 113. The bearing housing 250 is coupled to the cutting unit 113 (such as via the drive assembly casing 218) so as to rotate therewith, while the clamp ring 157 is coupled to the receiver 208 and the shaft tube 112 and remains generally stationary therewith. The two shoulders 155, 156 can be selectively clamped and un-clamped against the bearing housing 250 for retaining, such as by a frictional force or other retaining force, a rotational orientation between the clamp ring 157 and the bearing housing 250. For example, when it is desired to pivot the cutting unit 113 to a desired angle α, the locking means 202 can be disengaged such that the two shoulders 155, 156 are un-clamped against the bearing housing 250, which can permit the cutting unit 113 to be pivoted to a desired angle α, whereupon the two shoulders 155, 156 can be re-clamped against the bearing housing 250 to maintain the angle of the cutting unit 113.

As noted previously, the turning rod 121 can be threadingly engaged with a portion of the locking means 202 for selectively engagement and dis-engagement thereof (i.e., clamping and un-clamping of the clamp ring 157). For example, the other end 123 (i.e., the threaded end) of the turning rod 121 can extend through a threaded through opening 151 of one of two legs 152, 153 of a U-shaped clamp shoe 154. The clamp shoe 154 can be located over the two shoulders 155, 156.

The clamp ring 157 can have a slot 158 separating the two shoulders 155, 156 which are each provided with a through opening 159, 160 (i.e., such as a hole) that are generally aligned, such as coaxial, with the hole 151. One of the holes, such as the hole 159, can be threaded to support a screw 161 having one end abutting the end 123 of the turning rod 121. The screw 161 can be at least partially threaded into the hole 159, whereas the screw 161 can run freely through the hole 160. Further there can be one or more spring washers 162 surrounding the screw 161 and placed between the shoulder 156 and the head 163 of the screw 161.

Thus, similar to that described in FIG. 8, the locking means 202 can be utilized with the control means 204 and can operate in the following manner. When the locking function is to be loosed for un-clamping the clamp ring 157, the control means 202 can be actuated by rotating the sleeve 117 to in-turn rotate the tube socket 119 via the gear box 120 such that the turning rod 121 becomes a turning motion. The turning rod 121, because of the threaded engagement with the leg 152 of the clamp shoe 154, is moved towards the right in FIG. 15 with respect to the clamp shoe 154. The end 123 of the turning rod 121 can disengage the end of the screw 161. Thus, a force can be released and/or reduced from the clamp shoe 154 via the leg 153 to the screw head 163 such that the locking/clamping effect is reduced. Still, at the same time a certain grip can remain between of the bearing housing 250 of the cutting unit 113 and the clamp ring 157 because of the clamping force created by the spring washers 162. The operator can then change the angle α of the cutting unit 113 with respect to the shaft tube 112 in a manner described previously after which the control means 204 can be influenced to again lock the cutting unit 113 in the new position. For example, the operator can change the angle α of the cutting unit 113 by pressing the knives of the cutting unit 113 against a branch or the ground, or even by hand, etc.

When the locking function is to be tightened for clamping the clamp ring 157, the control means 202 can be actuated by rotating the sleeve 117 in the opposite direction to in-turn rotate the tube socket 119 via the gear box 120 such that the turning rod 121 becomes a turning motion in the opposite direction. The turning rod 121, because of the threaded engagement with the leg 152 of the clamp shoe 154, is moved towards the left in FIG. 15 with respect to the clamp shoe 154. The end 123 of the turning rod 121 can engage the end of the screw 161. Thus, a force can be applied and/or increased to the clamp shoe 154 via the leg 153 to the screw head 163 such that the locking/clamping effect is increased to decrease the distance between the two shoulders 155, 156 to thereby lock the clamping ring 157 about the bearing housing 250 of the cutting unit 113. The operator can then utilize the cutting unit 113 at the desired angle α with respect to the shaft tube 112 in a manner described previously herein.

Figure 16:
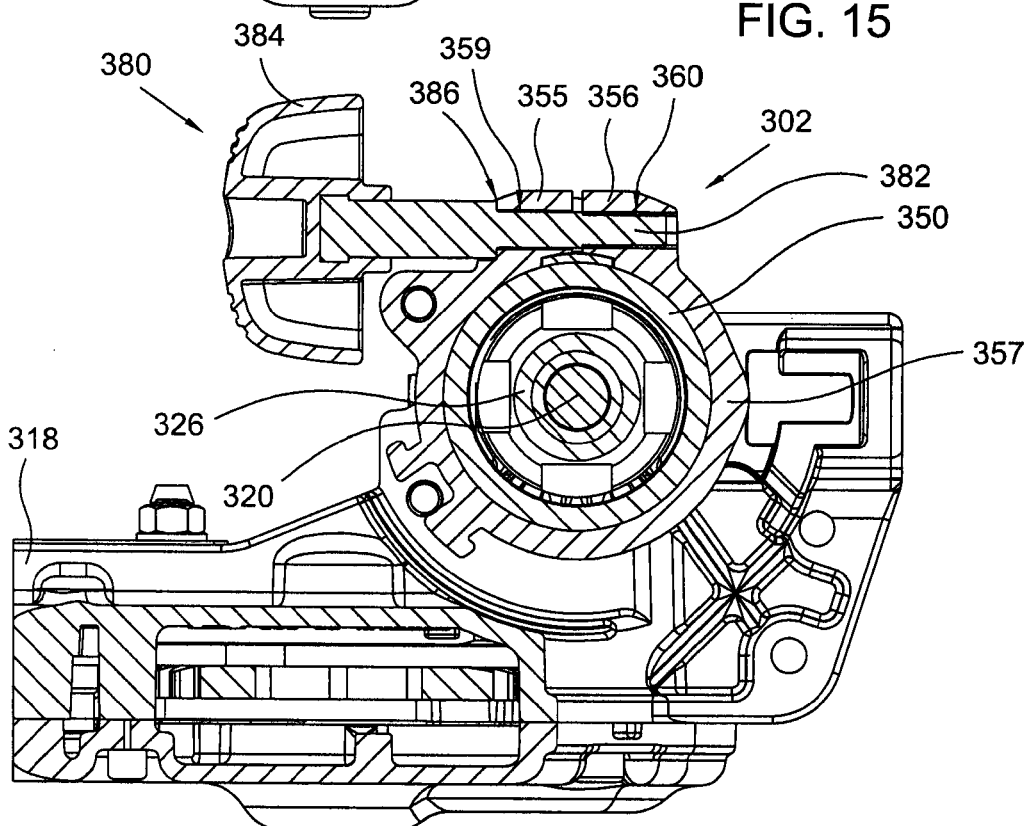
FIG. 16 is a sectional view taken along line 16-16 of FIG. 22.
Figure 17:
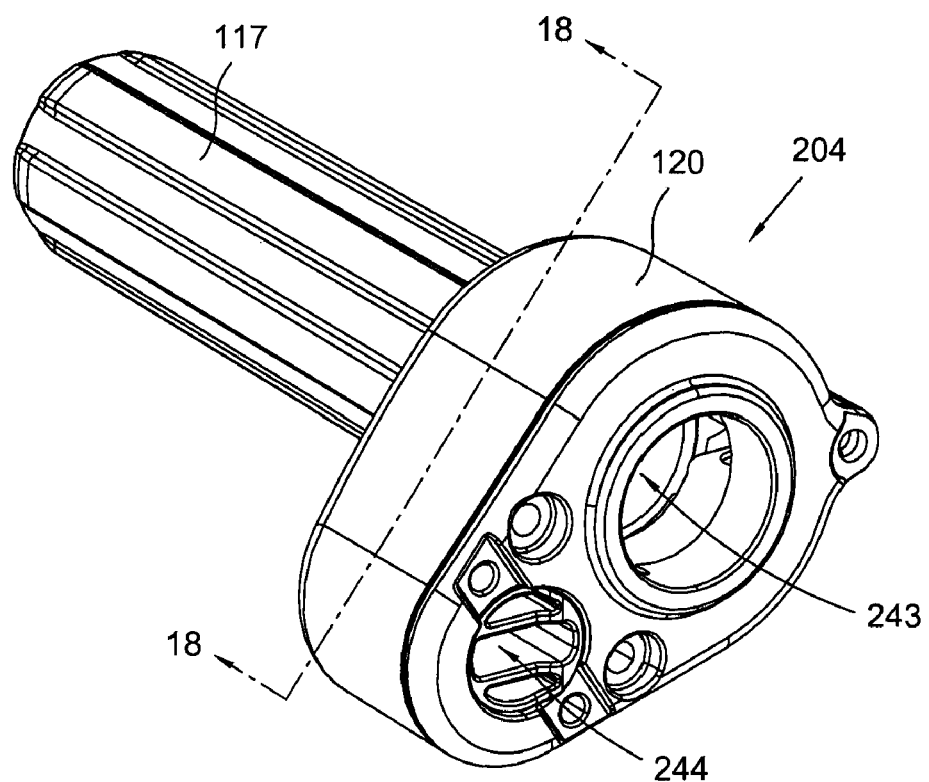
FIG. 17 is a perspective view of an example control means.
Figure 18:
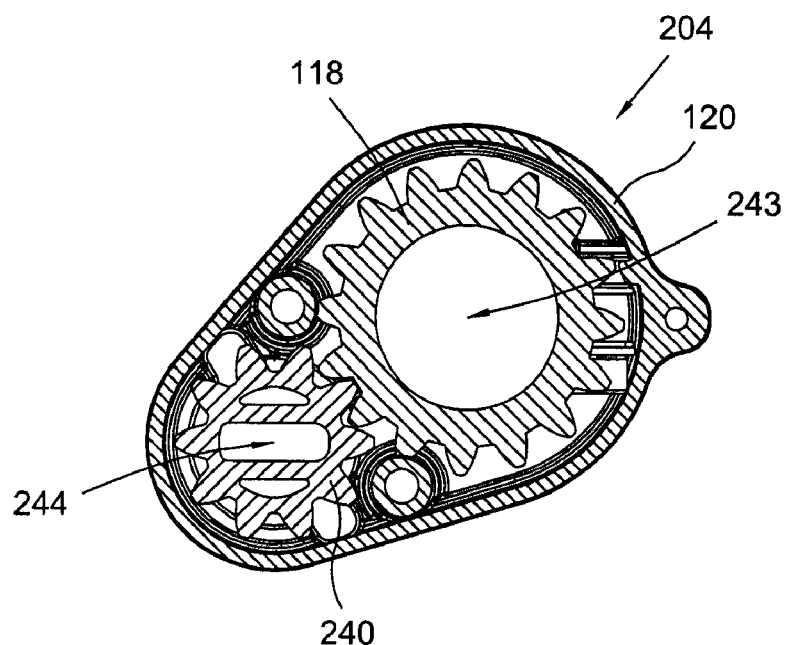
FIG. 18 is a sectional view taken along line 18-18 of FIG. 17.
Figure 19:
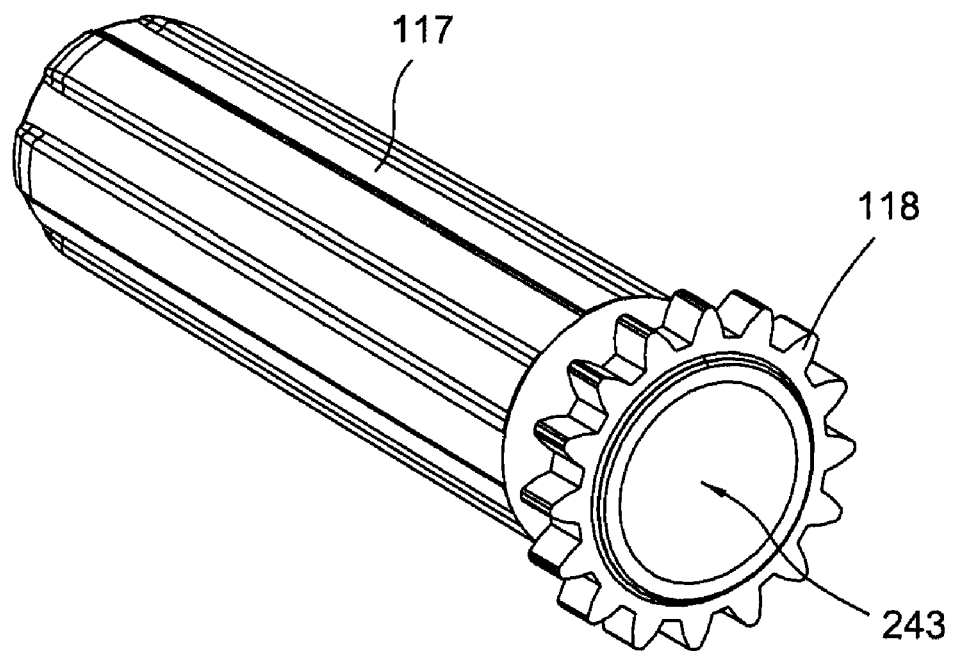
FIG. 19 is a perspective view of an example sleeve.
Figure 20:
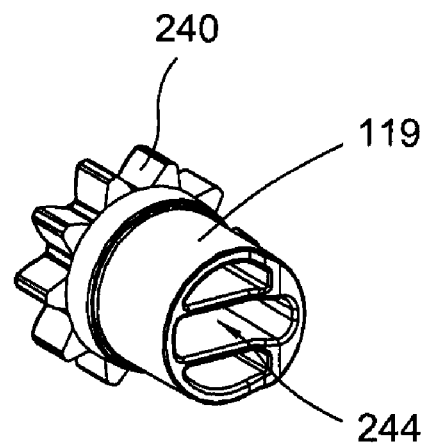
FIG. 20 is a perspective view of an example tube socket.
Figure 21:
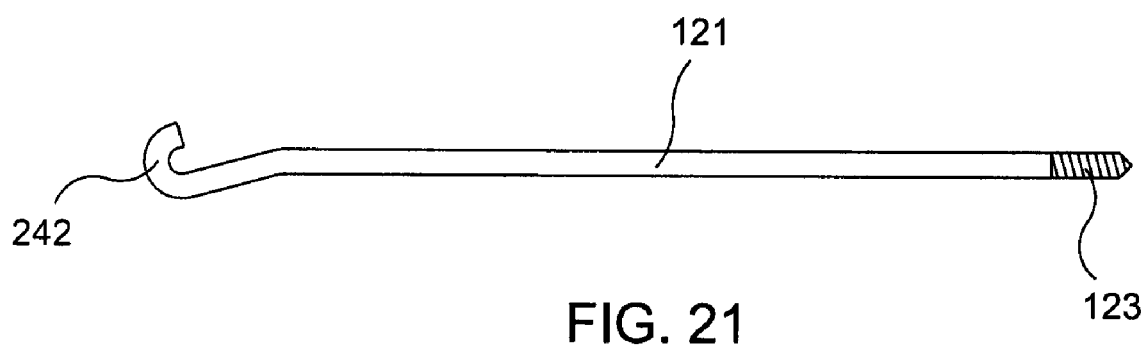
FIG. 21 is a side view of an example turning rod.
Figure 22:
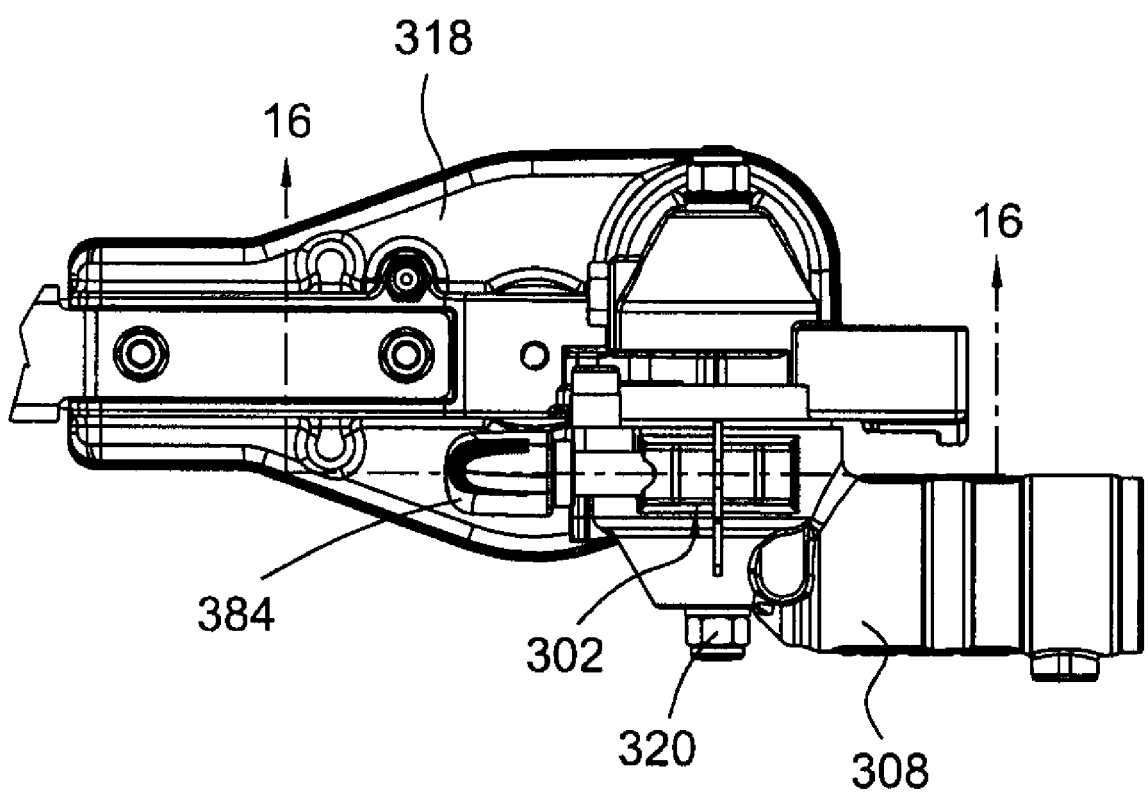
FIG. 22 is similar to FIG. 11, but shows another example control means.

Turning now to FIGS. 16 and 22, another example locking means 302 will be described. The locking means 302 can be utilized with the gear arrangement 114 previously described herein. The locking means 302 can operate similarly to the locking means 202 to selectively apply or release a clamping force, but can be a relatively more simplified system that may not utilize a remote control means 204.

For example, as shown in FIG. 16, the locking means 302 can generally include a clamp ring 357 having two shoulders 355, 356 arranged on a bearing housing 350 surrounding the central pin 320 and transfer element 326 for driving the cutting unit 113. The bearing housing 350 is coupled to the cutting unit 113 (such as via the drive assembly casing 318) so as to rotate therewith, while the clamp ring 357 is coupled to the receiver 308 (see FIG. 22) and the shaft tube (not shown) and remains generally stationary therewith. The two shoulders 355, 356 can be selectively clamped and un-clamped against the bearing housing 250 for retaining, such as by a frictional force or other retaining force, a rotational orientation between the clamp ring 357 and the bearing housing 350. For example, when it is desired to pivot the cutting unit 113 to a desired angle α, the locking means 302 can be disengaged such that the two shoulders 355, 356 are un-clamped against the bearing housing 350, which can permit the cutting unit 113 to be pivoted to a desired angle α, whereupon the two shoulders 355, 356 can be re-clamped against the bearing housing 350 to maintain the angle of the cutting unit 113.

The locking means 302 can include a local control means 380, which can include a threaded clamping screw 382 coupled to a handle 384. The threaded clamping screw 382 can be freely movable through a hole 359 in one shoulder 355, while being at least partially threaded into a hole 360 in the other of the two shoulders 356. In addition, the threaded clamping screw 382 can include an engagement portion 386 (such as a stepped shoulder) that can apply a force to one of the shoulders 355. Thus, when it is desired to apply or increase a clamping force to the clamp ring 157, the handle 384 can be rotated (such as by a hand of the user) such that the threaded portion of the clamping screw 382 causes the engagement portion 386 to engage the shoulder 355 for drawing the two shoulders 355, 356 closer together for clamping the clamp ring 157 against the bearing housing 350. When it is desired to release or reduce a clamping force to the clamp ring 157, such as for altering the angle α of the cutting unit 113, the handle 384 can be rotated in an opposite direction such that a force is reduced or released between the engagement portion 386 and the shoulder 355 for allowing the two shoulders 355, 356 move farther apart. Though not illustrated, one or more spring washers can be disposed between the engagement portion 386 and the shoulder 355 to provide some residual clamping force between the clamp ring 357 and the bearing housing 350.

In addition or alternatively, any of the locking means M, 202, 302 described herein can include additional features. In one example, structure (not shown) can be provided to facilitate maintaining the cutting unit 113 against the force of gravity even when in an un-clamped condition, and/or even at various predetermined angles α. For example, when the locking means M, 202, 302 is in the un-clamped position, it can be desirable for the cutting unit 113 to be at least partially supported against the force of gravity such that the cutting unit 113 does not immediately plunge downwards.

In another example, it can be desirable to facilitate placing or maintaining the cutting unit 113 at specific predetermined angles, which may be commonly used angles, such as 0 degrees, 30 degrees, 45 degrees, 60 degrees, 90 degrees, though various other angles are contemplated. Similarly, it can be desirable to inhibit rotation of the cutting unit 113 beyond a particular angle without additional user intervention. For example, it can be desirable to inhibit rotation of the cutting unit 113 beyond 90 degrees relative to the shaft tube 112, such as when the cutting unit 113 is folded backwards 180 degrees into the storage position.

In one example, as shown in FIG. 14, a safety stop 400 can be provided that inhibits rotation of the cutting unit 113. In one example, the safety stop 400 can include a pin 402 coupled to a resiliently biased stop member 404 that can be configured to engage a lock member 406 of the transfer element 226 (see also FIG. 15). The stop member 404 can be resiliently biased in various manners, such as by a spring or the like, generally away from engagement with the lock member 406. When a user attempts to rotate the cutting unit 113 beyond a particular angle, such as 90 degrees, the lock member 406 can automatically engage a portion of the end drive unit 206 coupled to the receiver 208 that can force the lock member 406 towards engagement with the lock member 406 to inhibit, such as prevent, further rotation of the cutting unit 113 beyond 90 degrees. Thus, a user can be required to manually retract the stop member 404 for disengagement from the lock member 406 to permit further rotation of the cutting unit 113 towards the storage position. The stop member 404 may similarly be utilized to inhibit rotation of the cutting unit 113 from the storage position to the operational position. In other examples, the safety stop structure can include a resiliently biased projection or the like (not shown) that selectively engages apertures and/or cam structure, etc.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. Motor driven tool, comprising a drive unit that via a shaft tube enclosing a drive shaft and having a handle, is connected to a cutting unit which is turnably secured to the shaft tube, characterized in that the turnable connection is under the influence of a locking mechanism which can be released by means of a control means arranged about the locking mechanism and at a distance from the handle, the control means comprising a rotatable handle sleeve coaxially located relative to the handle and coupled to a threaded clamping screw including an engagement portion, characterized in that the locking mechanism comprises a clamp means that at least partially surrounds a portion of the cutting unit around which the cutting unit is turnable for providing a clamping force thereto, characterized in that the clamp means comprises a clamp ring having two shoulders each provided with a through opening that receive the threaded clamping screw influenced by the rotatable handle sleeve, rotation of the rotatable handle sleeve acting upon the two shoulders of the locking mechanism to selectively provide the clamping force.

2. Tool according to claim 1, characterized in that the clamping screw is freely movable within one of the through openings of the two shoulders while the other of the through openings of the two shoulders is threadingly engaged with the screw, rotation of the clamping screw causing the two shoulders to be movable towards each other by engagement of the engagement portion of the clamping screw with at least one of the two shoulders.

3. Tool according to claim 1, characterized in that at least one spring washer is disposed between the engagement portion and one of the shoulders.

4. Tool according to claim 1, characterized in that the drive unit is operationally coupled to the cutting unit for driving the cutting unit via a gear arrangement, at least a portion of the gear arrangement being generally coaxial with a rotational axis of the cutting unit.

5. Tool according to claim 4, characterized in that the gear arrangement includes a drive shaft coupler engaged with a transfer element, that is in-turn engaged with a final drive element for driving the cutting unit.

6. Motor driven tool, comprising a drive unit that via a shaft tube enclosing a drive shaft and having a handle, is connected to a cutting unit which is turnably secured to the shaft tube, characterized in that the turnable connection is under the influence of a locking mechanism which can be released by control means operationally coupled to a locking mechanism, the control means comprising a rotatable member coaxially located relative to the handle and, characterized in that the locking mechanism comprises a clamp means that at least partially surrounds a portion of the cutting unit around which the cutting unit is turnable for providing a clamping force thereto, characterized in that the clamp means comprises a clamp ring having two shoulders each provided with a through opening that receive a threaded clamping screw influenced by the rotatable member, rotation of the rotatable member acting upon the two shoulders of the locking mechanism via the threaded clamping screw to selectively provide the clamping force, characterized in that the drive unit is operationally coupled to the cutting unit for driving the cutting unit via a gear arrangement, at least a portion of the gear arrangement being substantially coaxial with a rotational axis of the cutting unit.

7. Tool according to claim 6, characterized in that the control means comprises a rotatable member turnably supported at the shaft tube and connected to a rod by a gear transmission, rotation of the rotatable member causing the rod to rotate via the gear transmission, characterized in that the clamp means comprises a clamp shoe having a first leg with a through opening through which the threaded turning rod is inserted, and characterized in that rotation of the threaded turning rod, via a threaded engagment with the clamp shoe, causes the threaded turning rod to translate relative to the shaft tube in an axial direction, translation of the rod acting upon the locking mechanism to selectively provide the clamping force.

8. Tool according to claim 6, characterized in that the control means comprise a rotatable handle coupled to the threaded clamping screw including an engagement portion, and characterized in that the clamping screw is freely movable within one of the through openings of the two shoulders while the other of the through openings of the two shoulders is threadingly engaged with the screw, rotation of the clamping screw causing the two shoulders to be movable towards each other by engagement of the engagement portion of the clamping screw with at least one of the two shoulders.

9. Motor driven tool, comprising a drive unit that via a shaft tube enclosing a drive shaft and having a handle, is connected to a cutting unit which is turnably secured to the shaft tube, characterized in that the turnable connection is under the influence of a locking mechanism which from the normal working position of the operator can be released by means of a control means arranged at a distance from the locking mechanism and close to the handle, the control means comprising a rotatable member turnably supported at the shaft tube and connected to a threaded turning rod by a gear transmission, rotation of the rotatable member causing the threaded turning rod to rotate via the gear transmission, characterized in that the locking mechanism comprises a clamp means that at least partially surrounds a portion of the cutting unit around which the cutting unit is turnable for providing a clamping force thereto, characterized in that the clamp means comprises a clamp ring having two shoulders which are at least partially surrounded by a clamp shoe having a first leg with a through opening through which the threaded turning rod is inserted, the through opening of the clamp shoe being generally aligned with a through opening in each of the two shoulders that receive a screw arranged to be influenced by a second leg of the clamp shoe, the end of the screw normally abutting the end of the turning rod, rotation of the rod acting upon the locking mechanism to selectively provide the clamping force.

10. Tool according to claim 9, characterized in that rotation of the rotatable member, via a threaded engagement with the clamp shoe, causes the rod to translate relative to the shaft tube in an axial direction, translation of the rod acting upon the locking mechanism to selectively provide the clamping force.

11. Tool according to claim 10, characterized in that one end of the rod is slidably arranged in a pocket of a rotatable element of the gear transmission of the control means to permit the rod to simultaneously rotate and translate.

12. Tool according to claim 9, characterized in that the screw arranged to be influenced by the second leg of the clamp shoe is a spring loaded screw connection.

13. Tool according to claim 9, characterized in that one of the through openings of the two shoulders is threadingly engaged with the screw, the two shoulders being movable towards each other by engagement of the turning rod with an end of the screw.

14. Tool according to claim 13, characterized in that the turning rod is generally coaxial with the through openings of the two shoulders.

15. Tool according to claim 9 characterized in that rotatable member of the control means is adapted to rotate in a first direction and a second direction generally opposite the first direction, rotation of the rotatable member in the first direction causing a relative increase in the clamping force, and rotation of the rotatable member in the second direction causing a relative decrease in the clamping force.

16. Tool according to claim 9, characterized in that the rotatable member of the control means comprises a lever turnably arranged at the shaft tube.

17. Tool according to claim 9, characterized in that a safety stop includes a resiliently biased stop member that is configured to automatically engage a portion of the cutting unit to inhibit rotation of the cutting unit beyond a predetermined range.

18. Tool according to claim 9, characterized in that the drive unit is operationally coupled to the cutting unit for driving the cutting unit via a gear arrangement, at least a portion of the gear arrangement being generally coaxial with a rotational axis of the cutting unit.

19. Tool according to claim 18, characterized in that the gear arrangement includes a drive shaft coupler engaged with a transfer element, that is in-turn engaged with a final drive element for driving the cutting unit.

20. Tool according to claim 19, characterized in that the transfer element is generally coaxial with the rotational axis of the cutting unit.

* * * * *